(12) United States Patent
Kukreja

(10) Patent No.: US 10,040,459 B1
(45) Date of Patent: Aug. 7, 2018

(54) DRIVER FUEL SCORE

(71) Applicant: Lytx, Inc., San Diego, CA (US)

(72) Inventor: Muskan Kukreja, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/852,038

(22) Filed: Sep. 11, 2015

(51) Int. Cl.
*B60W 40/09* (2012.01)
*G07C 5/02* (2006.01)

(52) U.S. Cl.
CPC ............. *B60W 40/09* (2013.01); *G07C 5/02* (2013.01); *B60W 2540/10* (2013.01); *B60W 2540/12* (2013.01); *B60W 2540/18* (2013.01); *B60W 2540/30* (2013.01)

(58) Field of Classification Search
None
See application file for complete search history.

(56) References Cited

U.S. PATENT DOCUMENTS

| | | | |
|---|---|---|---|
| 2007/0143002 A1* | 6/2007 | Crowell | G07C 5/004 701/123 |
| 2011/0241864 A1* | 10/2011 | Fujiki | B60K 35/00 340/439 |
| 2013/0209968 A1* | 8/2013 | Miller | B60R 16/0236 434/65 |
| 2014/0195310 A1* | 7/2014 | McQuade | G06Q 10/06393 705/7.39 |
| 2016/0110935 A1* | 4/2016 | Kwak | G07C 5/0808 701/123 |
| 2016/0244067 A1* | 8/2016 | Hunt | B60W 40/09 |
| 2016/0252381 A1* | 9/2016 | Kwak | G07C 5/0808 |
| 2016/0253924 A1* | 9/2016 | Kwak | G09B 19/167 701/123 |
| 2016/0325681 A1* | 11/2016 | Van Dan Elzen | H04N 5/23203 |
| 2016/0342926 A1* | 11/2016 | Hunt | G09B 9/052 |

* cited by examiner

*Primary Examiner* — Rami Khatib
(74) *Attorney, Agent, or Firm* — Van Pelt, Yi & James LLP

(57) ABSTRACT

A system for determining a driver fuel score an input interface and a processor. The input interface is to receive a fuel efficiency measure for a vehicle or a vehicle type for a plurality of drivers. The processor is to determine a relative fuel performance score based at least in part on the relative fuel performance and determine a driver performance score based at least in part on the relative fuel performance.

24 Claims, 9 Drawing Sheets

DRIVER FUEL SCORE

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. However, the raw measured vehicle event data is not typically able to provide useful indications of certain driver performance parameters—for example, the ability of a driver to drive in a manner that conserves fuel.

BRIEF DESCRIPTION OF THE DRAWINGS

Various embodiments of the invention are disclosed in the following detailed description and the accompanying drawings.

DETAILED DESCRIPTION

Figure 1:
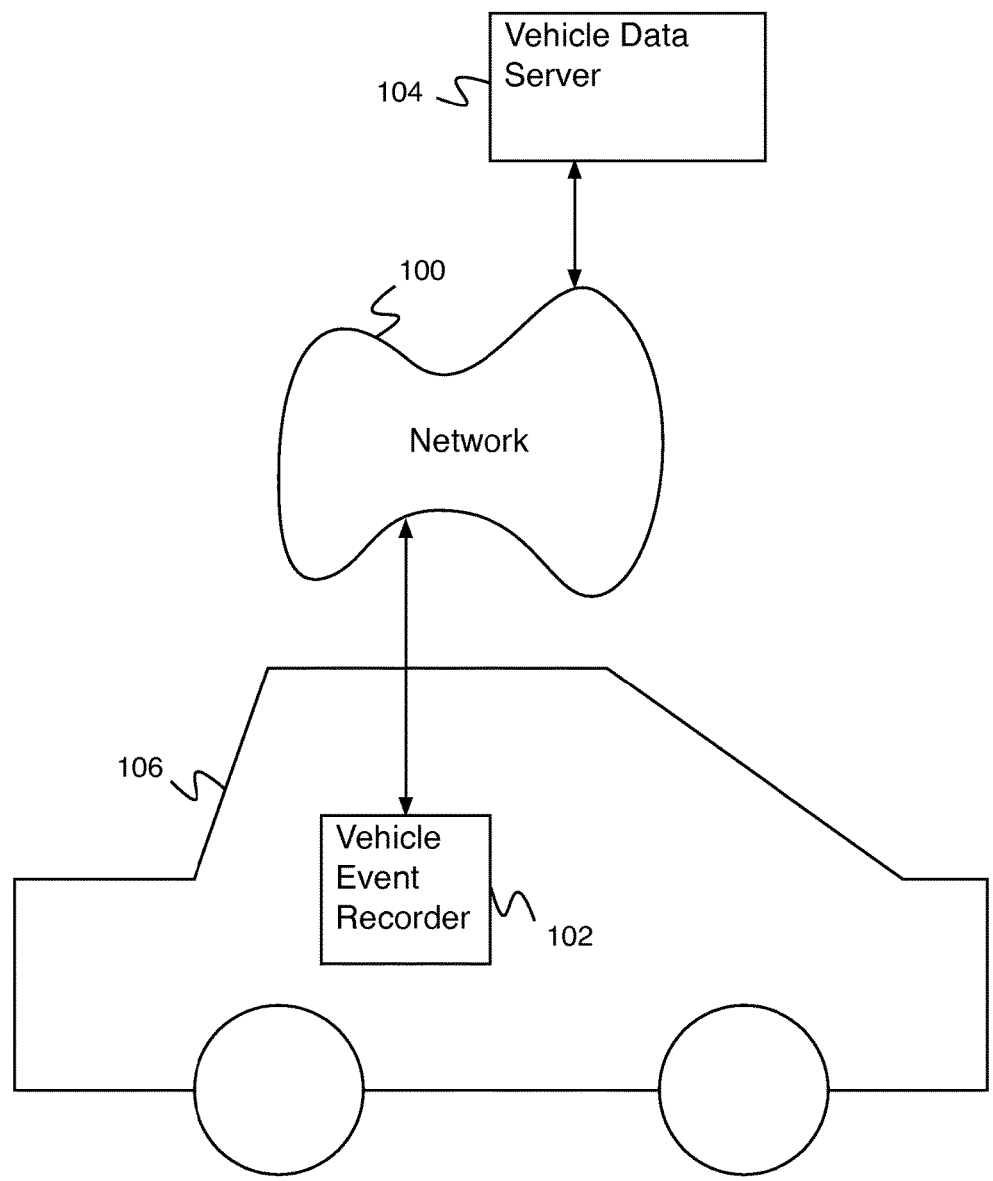
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a driver fuel score comprises an input interface for receiving a fuel efficiency measure for a vehicle or a vehicle type for a plurality of drivers; and a processor for determining a relative fuel performance score based at least in part on the relative fuel performance and determining a driver performance score based at least in part on the relative fuel performance.

In some embodiments, the system for determining a driver fuel score receives data from a plurality of drivers. In some embodiments, a driver fuel score comprises a measure of the fuel efficiency of the driver. In some embodiments, the system is able to determine the vehicle dependency of fuel efficiency (e.g., as different from a driver dependency of fuel efficiency). The plurality of drivers are sorted by vehicle or vehicle type. In some embodiments, only a single driver typically drives a given vehicle, and the only way to compare the fuel efficiency of multiple drivers is by comparing multiple drivers of a vehicle type. In some embodiments, multiple drivers drive the same vehicle and their fuel efficiency can be compared directly. Data is taken from a vehicle event recorder mounted in the vehicle and provided to a vehicle data server. In various embodiments, the data comprises engine revolutions per minute (e.g., RPM) data, throttle data, fuel injection rate data, vehicle speed data, global positioning system (GPS) speed data, GPS location data, odometer reading data, or any other appropriate data. The vehicle data server determines a set of metrics for the data (e.g., miles per gallon (MPG), a set of maneuver intensities, a set of engine scores, a set of driving ratios, etc.) and determines percentile scores for each metric. The percentile scores are then combined to get an overall driver fuel score. In some embodiments, the driver fuel score is fed back to the vehicle event recorder and used by the vehicle event recorder to determine trigger levels. In this way, a driver determined to be a more fuel-efficient driver (e.g., and therefore a more cautious driver) automatically has anomalous event detection thresholds changed to reflect the lowered likelihood of poor driving.

In some embodiments, a vehicle event recorder communicates with a vehicle sensor bus. Data is collected and summarized (e.g., characterized—for example, using statistics such as determining minimum, maximum, mean, standard deviation, etc.) every time period (e.g., 30 seconds) including engine revolutions per minimum (RPM), throttle, fuel injection rate, vehicle speed, global positioning system (GPS) speed, location, odometer reading, etc. After filtering out noise (e.g., periods of data—for example, a 30 second period in which there are not good measurements about their fuel consumption), distance traveled (e.g., average speed times the time period) and fuel consumption are calculated during the time period (e.g., a 30 second period).

Also, for this time period of data, the RPM information is used to classify the time period as driving, idling, or idling PTO (power turn on mode). For every driver vehicle information during a day, the driving MPG (e.g., by summing up the time periods only when driving and not idling nor idling in PTO) and also the overall driving MPG (for reporting purpose) per vehicle profile type mentioned above. For example, on May 25$^{th}$, Muskan had a driving MPG on Bus/Coach of 15 MPG, an overall MPG on Bus/Coach of 13 MPG, a driving MPG on Concrete/Cement Mixer of 12 MPG, and an overall MPG on Concrete/Cement Mixer of 10 MPG.

In some embodiments, an additional set of measurements is determined for each ride. The additional set of measurements comprises maneuver intensities—e.g., average intensity of Acceleration/Braking/Cornering Maneuver: Whenever the driver accelerates/brakes/corners with high severity, the number of times and the severity is recorded. So, on a daily basis Driver Smith has an acceleration, braking, and cornering score based on the number and severity of the events. Let's call them A, B, C score for a driver respectively (e.g., a driver with high A, B, C score have lower MPG).

In some embodiments, the additionally set of measurements comprises a set of engine scores and driving ratios. RPM Score: average rate of increase of RPM of a driver is calculated. So in the event that the driver drives smoothly, the rate of change of RPM is low, in the event that the driver drives rashly, the driver's rate of increase of RPM is pretty high (e.g., higher RPM score corresponds to lower MPG). Throttle score: similar to RPM, the driver's average rate of increase of the throttle is measured (e.g., how much pressure he puts on pedal). A higher throttle score is found to be correlated with lower MPG of drivers. Gear score: derive the gear score from the RPM/speed ratio and calculate the percentage of time spent in the top gear. Along with that, the minimum and maximum speed in the top gear is calculated. Using the percentage of time in top gear and the minimum and maximum speed at top gear, the gear score is calculated. The gear score is correlated with MPG. Coasting ratio: the percentage of time a driver does not put pressure on gas pedals, letting the vehicle roll by itself, thereby saving MPG. Idling ratio: the percentage of time a driver spends idling. Speed ratio: the percentage of speeding violations through the day.

In some embodiments, once all the above characteristics are calculated for driver vehicle profile type, a percentile of each score mentioned above is calculated compared to the population. For example, driver Smith is 80% percentile on acceleration severity, 70% on gear score, 60% of MPG percentile etc. The overall daily score is calculated by weighting each of the percentile rankings of the driver in each category. For example, the driver Fuel score=a*Acceleration percentile+b*Braking percentile+c*MPG percentile+d*Coasting ratio+e*RPM percentile+ . . . , where the weights a, b, c, d, and e are determined empirically by using historical data). A rolling average of the driver fuel score is determined by averaging their last 30 days fuel score.

In some embodiments, a vehicle fuel score is determined in addition to the driver fuel score. The vehicle fuel score for a given trip, or segment of a trip, is determined by the vehicle event recorder using the same data as the driver fuel score. In some embodiments, maneuver intensities, engine scores, and driving ratios are left out of the determination of the vehicle fuel score, and the determination of the vehicle fuel score is made using only the determined miles per gallon for the trip. In some embodiments, driver fuel scores and vehicle fuel scores are stored for each trip. In some embodiments, in order to leave anomalous vehicles (e.g., lower performing vehicles) out of a determination of driver fuel score, for any trip that is unusual for a driver (e.g., in the lowest 20% of fuel scores for rides by the driver), a determination is made whether a vehicle is in the lower half of vehicles by fuel score performance. In the event it is determined that the vehicle is unusual (e.g., in the lowest 20%, lowest 50%, etc.), the trip is left out of a set of statistics when determining the average fuel score for the driver.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises a system for detecting risky behavior. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, different networks comprising network 100 comprise different bandwidth cost (e.g., a wired network has a very low cost, a wireless Ethernet connection has a moderate cost, a cellular data network has a high cost). In some embodiments, network 100 comprises multiple networks, changing over time and location. In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In various embodiments, vehicle data server 104 is located at a colocation center (e.g., a data center where equipment, space and bandwidth are available for rental), at a cloud service provider, or any other appropriate location. In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly.

Figure 2:
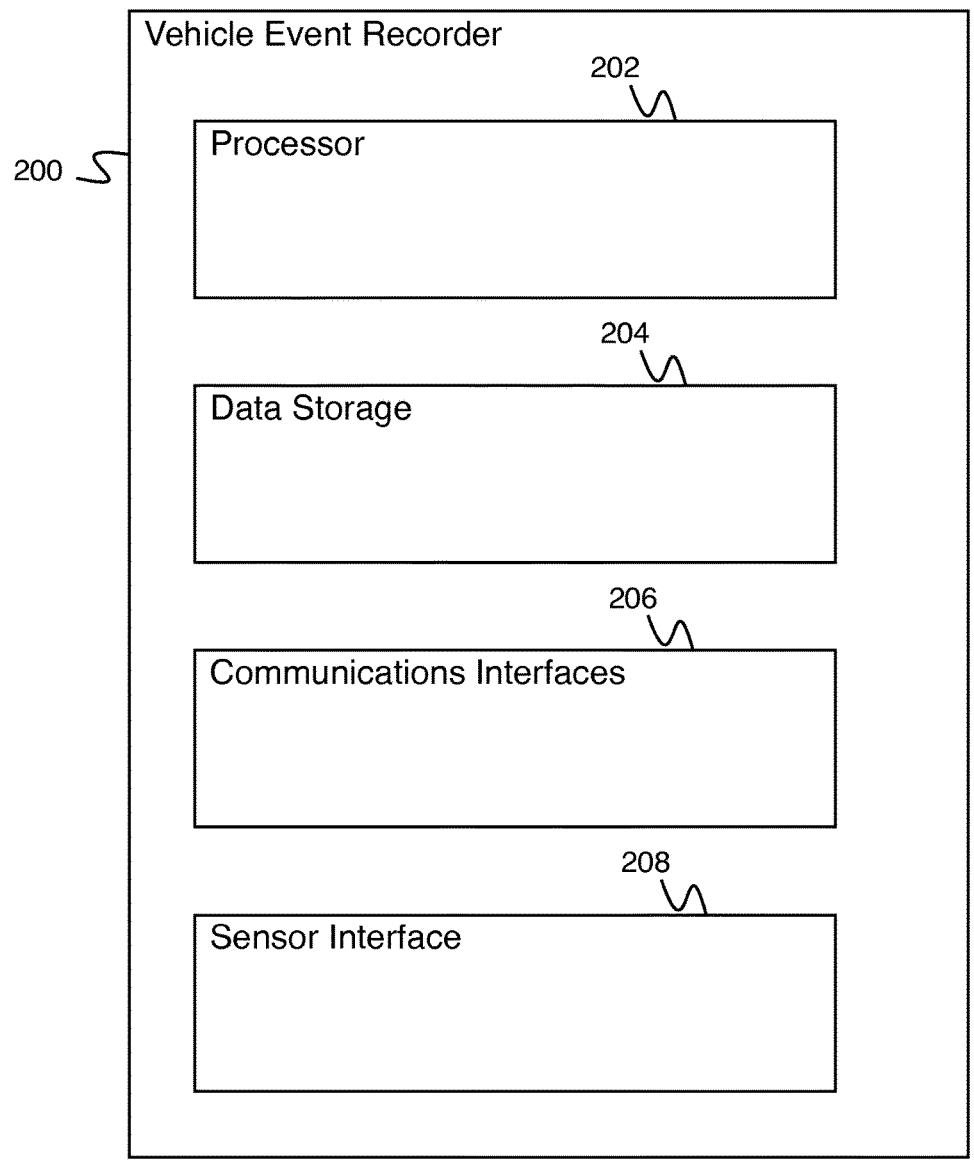
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, and for reading data via sensor interface 208. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, driver scores, or any other appropriate data. In various embodiments, communications interfaces 206 comprises one or more of a GSM interface, a CDMA interface, a LTE interface, a UMTS interface, a WiMAX interface, a DSRC interface, a WiFi™ interface, an Ethernet interface, a Universal Serial Bus (USB) interface, a Bluetooth™ interface, an Internet interface, or any other appropriate interface. Sensor interface 208 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via OBD bus.

Figure 3:
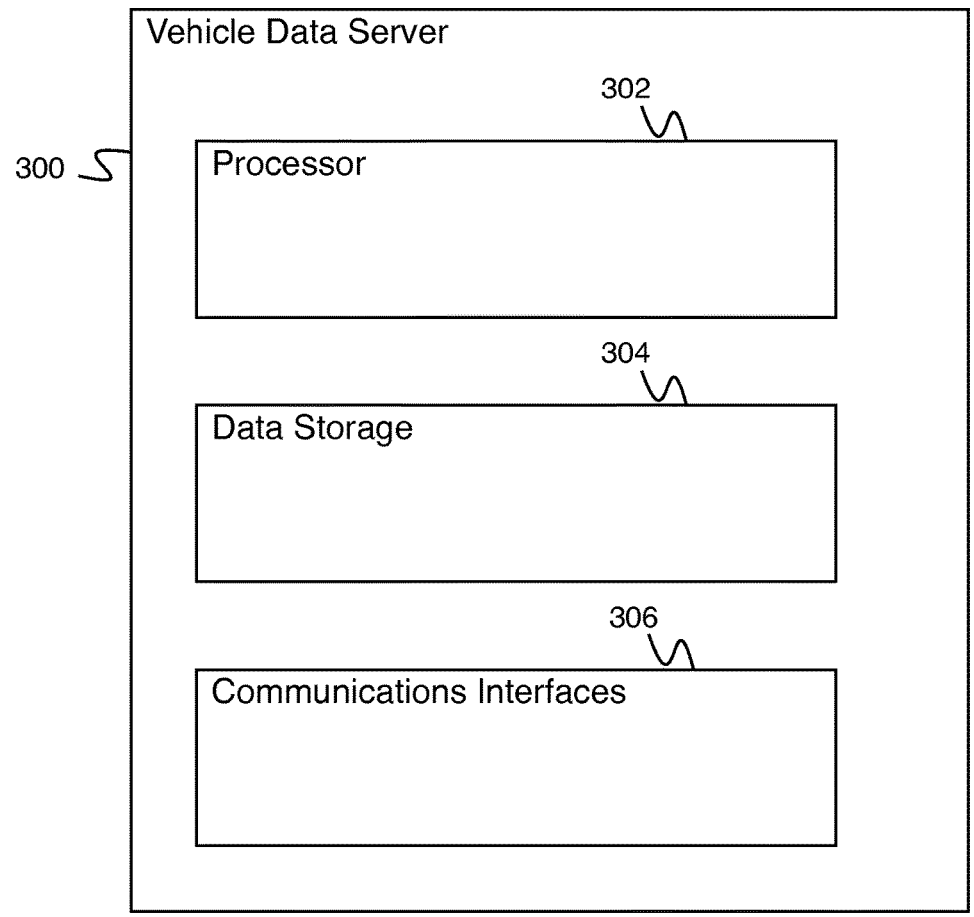
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises processor 302. In various embodiments, processor 302 comprises a processor for determining driver shifts, determining driver data, determining driver warnings, determining driver coaching information, determining a driver fuel performance, determining a driver performance score, determining a driver fuel score, or determining any other appropriate information. Data storage 304 comprises a data storage (e.g., a random access memory (RAM), a read only memory (ROM), a nonvolatile memory, a flash memory, a hard disk, or any other appropriate data storage). In various embodiments, data storage 304 comprises a data storage for storing instructions for processor 302, vehicle event recorder data, vehicle event data, sensor data, video data, map data, or any other appropriate data. In various embodiments, communications interfaces 306 comprises one or more of a GSM interface, a CDMA interface, a WiFi interface, an Ethernet interface, a USB interface, a Bluetooth interface, an Internet interface, a fiber optic interface, or any other appropriate interface.

Figure 4:
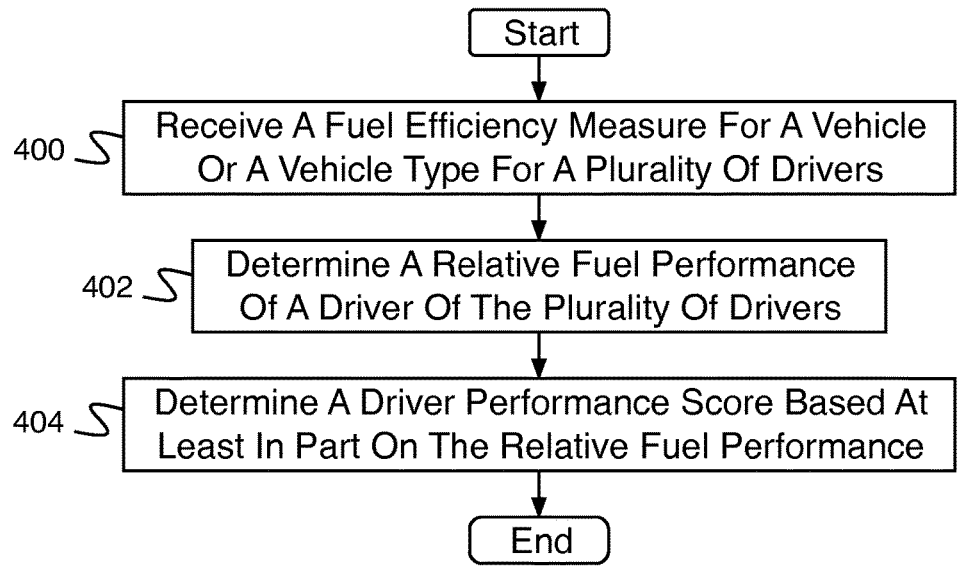
FIG. 4 is a flow diagram illustrating an embodiment of a process for determining a driver fuel score.

FIG. 4 is a flow diagram illustrating an embodiment of a process for determining a driver fuel score. In some embodiments, the process of FIG. 4 is executed by vehicle data server 104 of FIG. 1. In the example shown, in 400, a fuel efficiency measure for a vehicle or a vehicle type for a plurality of drivers is received. In various embodiments, a fuel efficiency measure comprises a miles per gallon measure, a fuel burned measure, a distance traveled measure, a throttle measure, or any other appropriate fuel efficiency measure. In 402, a relative fuel performance of a driver of the plurality of drivers is determined. In some embodiments, a relative fuel performance comprises a relative fuel performance compared with other drivers of the vehicle. In some embodiments, a relative fuel performance comprises a relative fuel performance compared with other drivers of the vehicle type. In various embodiments, the relative fuel performance score comprises a percentile, a z-score, a rank, a fuel performance score compared with other drivers of a vehicle or a vehicle type, or any other appropriate score. In 404, a driver performance score is determined based at least in part on the relative fuel performance.

Figure 5:
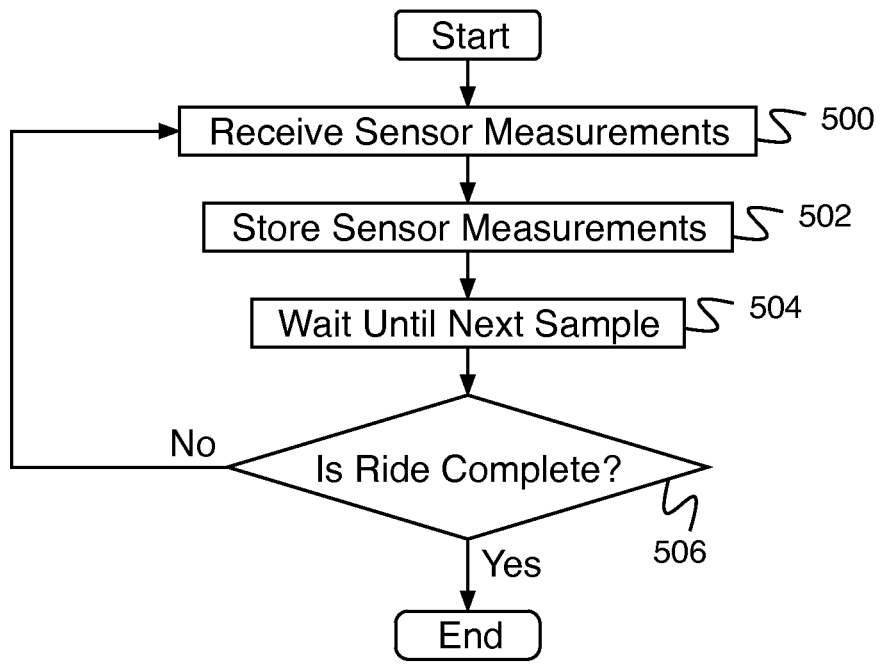
FIG. 5 is a flow diagram illustrating an embodiment of a process for determining a fuel efficiency measure for a driver for a vehicle.

FIG. 5 is a flow diagram illustrating an embodiment of a process for determining a fuel efficiency measure for a driver for a vehicle. In some embodiments, the process of FIG. 5 is executed by a vehicle event recorder (e.g., vehicle event recorder 102 of FIG. 1). In some embodiments, the process of FIG. 5 comprises a process for determining a fuel efficiency measure for a ride (e.g., a single trip, a single job shift, etc.) for a driver. In some embodiments, the fuel efficiency measure is provided to a vehicle data server (e.g., vehicle data server 104 of FIG. 1). In some embodiments, the fuel measure is received by the vehicle data server as part of a process for receiving a fuel efficiency measure for a vehicle type for a plurality of drivers (e.g., 400 of FIG. 4). In the example shown, in 500, sensor measurements are received. In various embodiments, sensor measurements comprise engine revolutions per minute (e.g., RPM) measurements, throttle measurements, fuel injection rate measurements, vehicle speed measurements, global positioning system (e.g., GPS) speed measurements, GPS location measurements, odometer reading measurements, or any other appropriate sensor measurements. In 502, the sensor measurements are stored. In 504, the process waits until the next sample. In various embodiments, the process waits 0.1 seconds, 1 second, 5 seconds, 30 seconds, 100 seconds, 300 seconds, or any other appropriate amount of time. In 506, it is determined whether the ride is complete. In various embodiments, it is determined that the ride is complete in the event that the vehicle is turned off, in the event that a destination location has been reached, in the event that a ride complete time has been reached, in the event that a manual ride complete indication has been made, or by any other appropriate means. In the event it is determined that the ride is not complete, control passes to 500. In the event it is determined that the ride is complete, the process ends.

Figure 6:
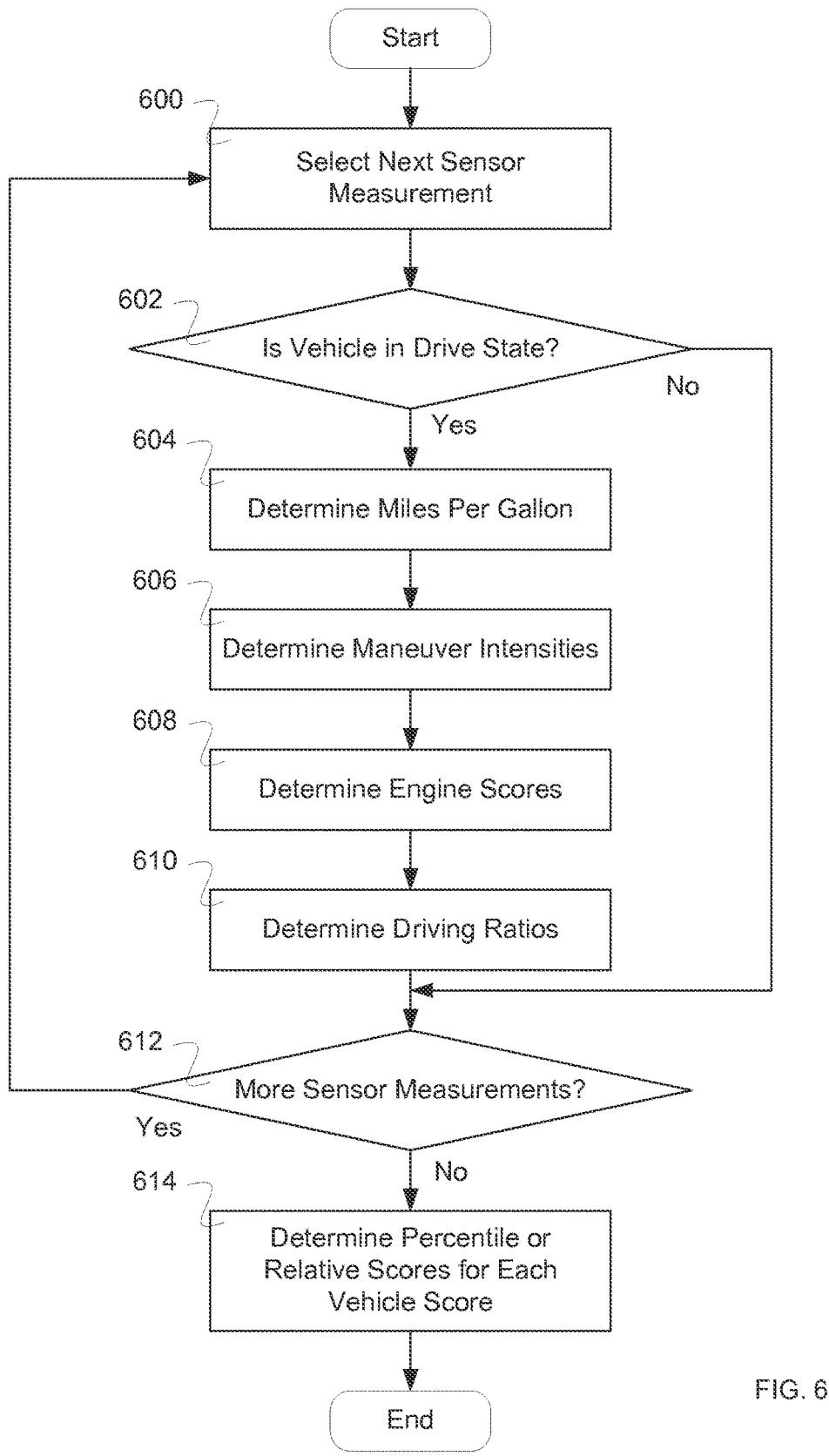
FIG. 6 is a flow diagram illustrating an embodiment of a process for determining a relative fuel performance of a driver of a plurality of drivers.

FIG. 6 is a flow diagram illustrating an embodiment of a process for determining a relative fuel performance of a driver of a plurality of drivers. In some embodiments, the process of FIG. 6 implements 402 of FIG. 4. In the example shown, in 600, a next sensor measurement is selected. In some embodiments, a next sensor measurement comprises a sensor measurement taken at a next time within a trip or segment of a trip. In some embodiments, a next sensor measurement comprises a sensor measurement taken at a first time within a trip or segment of a trip. In 602, it is determined whether the vehicle is in drive state (e.g., at the time of the sensor measurement). In some embodiments, it is determined whether the vehicle is in drive state by determining whether the engine RPM is above an idling threshold. In some embodiments, in the event that the vehicle is not in drive state it is in either idling state or idling with power turn-on state. In the event it is determined that the vehicle is in drive state, control passes to 604. In the event it is determined that the vehicle is not in drive state, control passes to 612. In 604, vehicle miles per gallon is determined. In some embodiments, vehicle miles per gallon is determined by determining a quotient of a vehicle miles in the last sensor sample and a vehicle gallons of gas used in the last sensor sample. In some embodiments, vehicle miles in the last sensor sample is determined by multiplying the vehicle speed at the last sensor sample by the sample time. In some embodiments, vehicle miles in the last sensor sample is determined by taking a difference in odometer readings. In some embodiments, vehicle gallons of gas used in the last sensor sample is determined by multiplying the rate of gas used by the sample time. In various embodiments, the rate of gas used is determined from a throttle measurement, a fuel injection rate measurement, or any other appropriate measurement. In 606, maneuver intensities are determined. In various embodiments, maneuver intensities comprise acceleration intensity, braking intensity, cornering intensity, or any other appropriate intensities. In some embodiments, maneuver intensities comprise scores derived from the frequency and intensity of maneuver events. For example, a maneuver intensity comprises an acceleration score that is defined as a function of forward and lateral acceleration (e.g., a sum or geometric mean of the accelerations, etc.) divided by a number of extreme triggers of acceleration. In 608, engine scores are determined. In various embodiments, engine scores comprise an RPM score, a throttle score, a gear score, or any other appropriate engine scores. In some embodiments, an RPM score=sum (x*sign (x))/time, where x is RPM(t+1)−RPM(t), t is measured time units. In some embodiments, the throttle score=sum (x*sign (x))/time, where x is throttle(t+1)−throttle(t), t is measured time units. In some embodiments, an RPM score comprises the average rate of increase of RPM of a driver (e.g., an aggressive driver will have a higher rate of RPM increase and a higher RPM score than a conservative driver). In some embodiments, a throttle score comprises the average rate of increase of throttle of a driver (e.g., an aggressive driver will have a higher rate of throttle increase and a higher throttle score than a conservative driver). In some embodiments, a gear score comprises a score derived from the fraction of the time the transmission is in the highest gear, the lowest speed driven in the highest gear, and the highest speed driven in the highest gear. In some embodiments, the vehicle gear is determined from the ratio of the vehicle RPM and the vehicle speed. In 610, driving ratios are determined. In various embodiments, driving ratios comprise a coasting ratio, an idling ratio, a speed ratio, or any other appropriate driving ratios. In some embodiments, a coasting ratio comprises a fraction of the time the driver allows the vehicle to coast. In some embodiments, an idling ratio comprises a fraction of the time the driver allows the vehicle to idle. In some embodiments, a speed ratio comprises a fraction of the time the driver is driving above the speed limit. In 612, it is determined whether there are more sensor measurements (e.g., whether there are more sensor measurements taken in the trip or trip segment). In the event it is determined in 612 that there are more sensor measurements, control passes to 600. In the event it is determined in 612 that there are not more sensor measurements, control passes to 614. In 614, percentile or relative scores are determined for each vehicle score. In some embodiments, determining a percentile score for a vehicle score comprises determining the fraction of all the vehicle scores received that are below the vehicle score for which the determination is made (e.g., in the event that a determined miles per gallon is higher than 83% of the miles per gallon values determined, the determined miles per gallon has an 83% percentile score). In some embodiments, percentile scores are determined for each vehicle score determined in determine miles per gallon 604, determine maneuver intensities 606, determine engine scores 608, and determine driving ratios 610.

Figure 7:
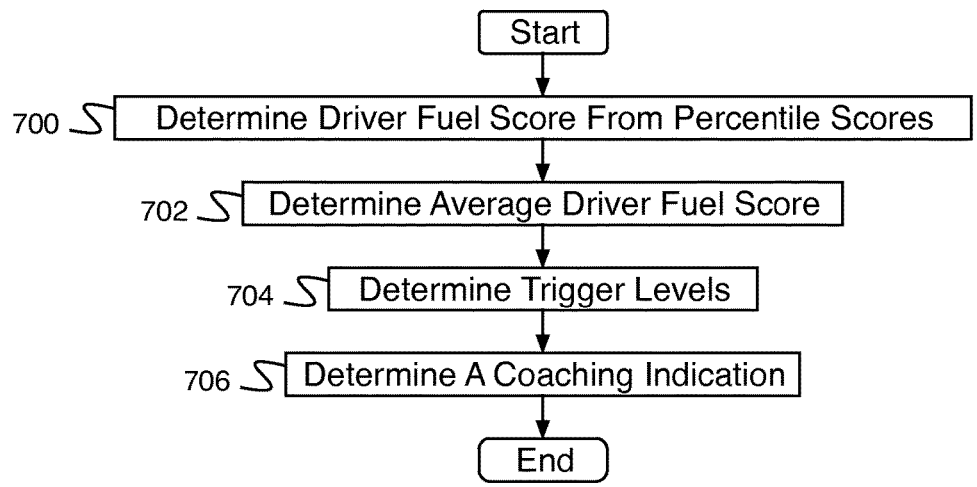
FIG. 7 is a flow diagram illustrating an embodiment of a process for determining a driver performance score based at least in part on a relative fuel performance.

FIG. 7 is a flow diagram illustrating an embodiment of a process for determining a driver performance score based at least in part on a relative fuel performance. In some embodiments, the process of FIG. 7 implements 404 of FIG. 4. In the example shown, in 700, a driver fuel score is determined from percentile scores. In various embodiments, percentile scores comprises miles per gallon percentile scores, maneuver intensity percentile scores, engine percentile scores, driving ratio percentile scores, or any other appropriate percentile scores. In some embodiments, determining a driver fuel score from percentile scores comprises determining a weighted combination of percentile scores. In some embodiments, weights used when determining a weighted combination of percentile scores are determined empirically. In 702, an average driver fuel score is determined. In some embodiments, an average driver fuel score comprises an average of a set of driver fuel scores determined over a period of time. In some embodiments, the period of time comprises one week, one month, one year, or any other appropriate period of time. In 704, trigger levels are determined. In some embodiments, trigger levels comprise sensor data levels at which it is determined that an anomalous event is occurring (e.g., at which the detection of an anomalous event is triggered). In various embodiments, trigger levels comprise sensor signal level(s) at which an event is to be stored, transmitted, marked for coaching, or any other appropriate action. In some embodiments, in the event that the driver fuel score is determined to increase (e.g., the driver is determined to be driving more efficiently), the trigger level is determined to increase (e.g., sensor data levels are required to be more anomalous for an anomalous event to be detected). In some embodiments, trigger levels are determined by the vehicle data server. In some embodiments, the trigger levels are provided by the vehicle data server to the vehicle event recorder. In some embodiments, the average driver fuel score is provided to a vehicle event recorder (e.g., the vehicle event recorder associated with the driver) and the vehicle event recorder determines trigger levels. In 706, a coaching indication is determined. In some embodiments, a fuel score coaching indication is determined in the event the average driver fuel score drops below a threshold level. In some embodiments, a fuel score coaching indication comprises an indication that the driver should be coached on fuel efficiency.

Figure 8:
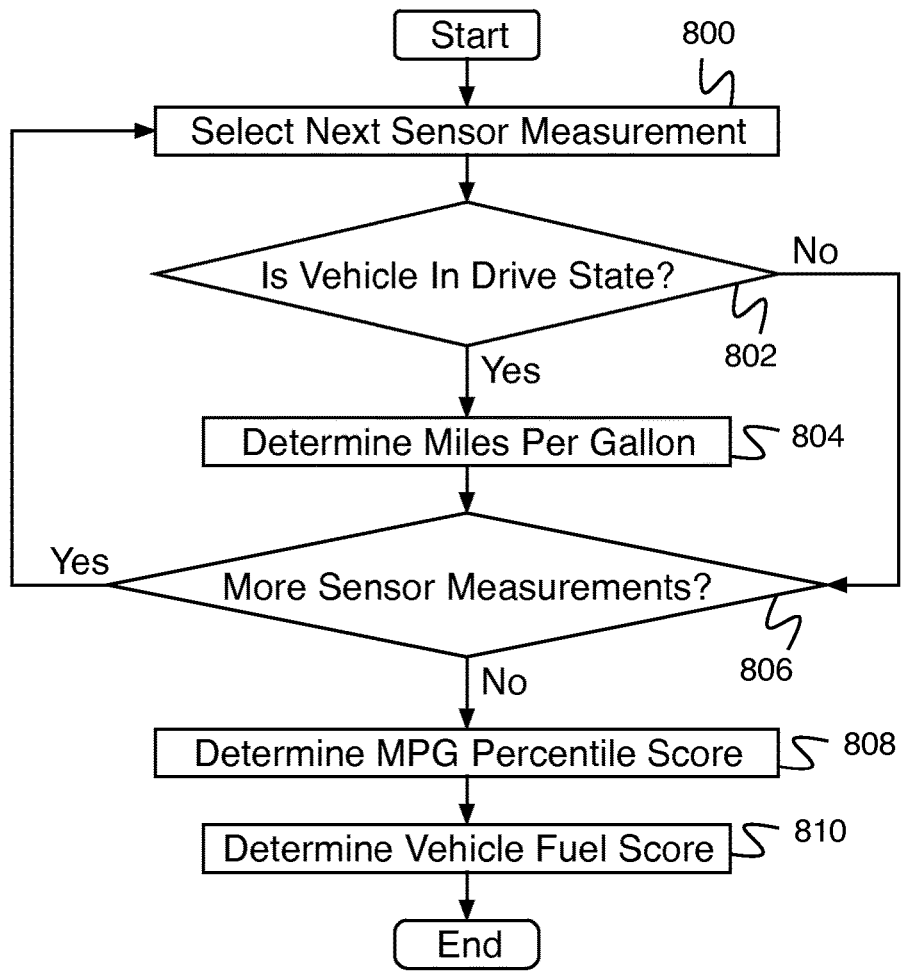
FIG. 8 is a flow diagram illustrating an embodiment of a process for determining a relative fuel performance of a vehicle of a plurality of vehicles.

FIG. 8 is a flow diagram illustrating an embodiment of a process for determining a relative fuel performance of a vehicle of a plurality of vehicles. In some embodiments, the process of FIG. 8 operates on fuel efficiency measures for a plurality of vehicles or vehicle types for a plurality of drivers.

In the example shown, in 800, a next sensor measurement is selected. In some embodiments, a next sensor measurement comprises a sensor measurement taken at a next time within a ride. In some embodiments, a next sensor measurement comprises a sensor measurement taken at a first time within a ride. In 802, it is determined whether the vehicle is in drive state (e.g., at the time of the sensor measurement). In some embodiments, it is determined whether the vehicle is in drive state by determining whether the engine RPM is below an idling threshold. In some embodiments, in the event that the vehicle is not in drive state it can be in either idling state or idling with power turn-on state. In the event it is determined that the vehicle is in drive state, control passes to 804. In the event it is determined that the vehicle is not in drive state, control passes to 806. In 804, vehicle miles per gallon is determined. In some embodiments, vehicle miles per gallon is determined by determining a quotient of a vehicle miles in the last sensor sample and a vehicle gallons of gas used in the last sensor sample. In some embodiments, vehicle miles in the last sensor sample is determined by multiplying the vehicle speed at the last sensor sample by the sample time. In some embodiments, vehicle gallons of gas used in the last sensor sample is determined by multiplying the rate of gas used by the sample time. In various embodiments, the rate of gas used is determined from a throttle measurement, a fuel injection rate measurement, or any other appropriate measurement. In 806, it is determined whether there are more sensor measurements (e.g., whether there are more sensor measurements taken in the ride). In the event it is determined in 806 that there are more sensor measurements, control passes to 800. In the event it is determined in 806 that there are not more sensor measurements, control passes to 808. In 808, an MPG percentile scores is determined. In some embodiments, determining an MPG percentile score comprises determining the fraction of all MPG scores received that are below the MPG score for which the determination is made (e.g., in the event that a determined miles per gallon is higher than 83% of the miles per gallon values determined, the determined miles per gallon has an 83% percentile score). In 810 a vehicle fuel score is determined. In some embodiments the vehicle fuel score comprises the MPG percentile score. In some embodiments, the vehicle fuel score comprises the MPG percentile score multiplied by a weighting factor, the MPG percentile score in a linear combination with other scores, an expression based on the MPG percentile score in any other appropriate way, or any other appropriate vehicle fuel score. In some embodiments, the vehicle fuel score is determined by averaging MPG percentile scores for all rides associated with the vehicle.

Figure 9:
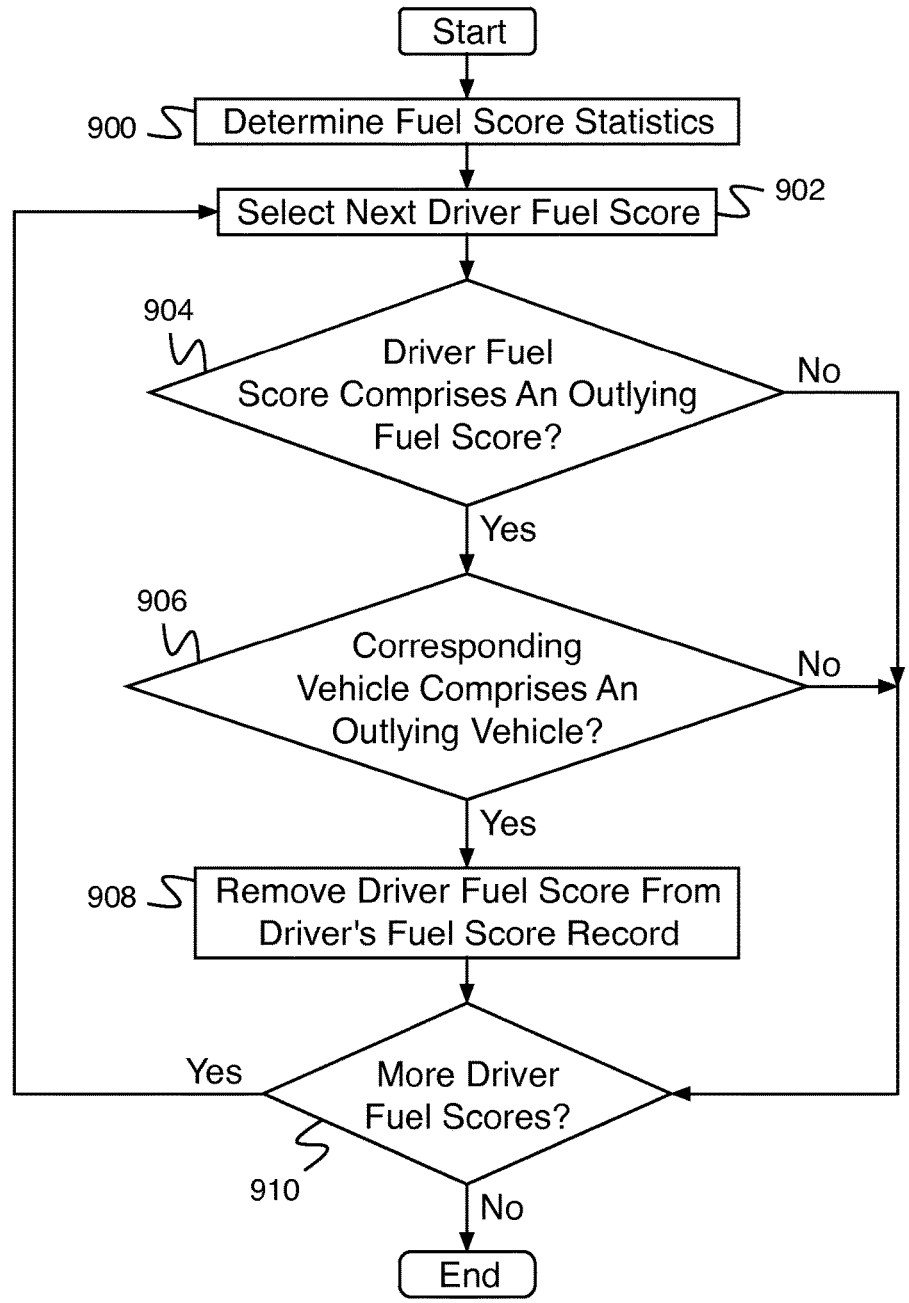
FIG. 9 is a flow diagram illustrating an embodiment of a process for adjusting a driver fuel score.

FIG. 9 is a flow diagram illustrating an embodiment of a process for adjusting a driver fuel score. In some embodiments, the process of FIG. 9 comprises a process for removing outlier vehicles from a driver fuel score. In the example shown, in 900, fuel score statistics are determined. In 902, a next driver fuel score is selected. In some embodiments, the next driver fuel score comprises the first driver fuel score. In 904, it is determined whether the driver fuel score comprises an outlying fuel score. In various embodiments, the driver fuel score comprises an outlying fuel score in the event that the driver fuel score is in the top or bottom 1%, 5%, 10%, 20%, 1 sigma (standard deviation), or half of the driver's fuel scores, or any other appropriate outlier definition. In the event it is determined that the driver fuel score does not comprise an outlying fuel score, control passes to 910. In the event it is determined that the driver fuel score comprises an outlying fuel score, control passes to 906. In 906, it is determined whether the corresponding vehicle (e.g., the vehicle corresponding to the outlying fuel score) comprises an outlying vehicle. In various embodiments, an outlying vehicle comprises a vehicle in the top or bottom 1%, 5%, 10%, 20%, 1 sigma (standard deviation), or half of vehicles by fuel score (e.g., at least half of vehicles in the associated fleet have fuel scores higher than the outlying vehicle), or any other appropriate outlier definition. In the event it is determined that the corresponding vehicle does not comprise an outlying vehicle, control passes to 910. In the event it is determined that the corresponding vehicle comprises an outlying vehicle, control passes to 908. In 908, the driver fuel score is removed from the driver's fuel score record (e.g., the fuel score is not included in the computations of the driver's overall fuel score, the fuel score is removed from the set of scores used in the calculations but still stored for future calculations, etc.). In 910, it is determined whether there are more driver fuel scores. In the event it is determined that there are more driver fuel scores, control passes to 902. In the event it is determined that there are not more driver fuel scores, the process ends.

In some embodiments, the driver fuel score is used to improve a driver safety score. For example, driver fuel score is used as one of the predictors in calculating driver safety score. In some embodiments, the driver fuel score is used to improve a vehicle safety score. For example, vehicle fuel score is used as one of the predictors in calculating vehicle safety score.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system comprising:
  an input interface to receive a sensor reading of a state of a vehicle, wherein the sensor reading is collected by a vehicle event recorder provided in a vehicle;
  a communications system for communication with a network; and
  a vehicle data server comprising a processor configured to:
   determine a relative fuel performance score based at least in part on the sensor reading, wherein the relative fuel performance score is a measure of a fuel performance of the vehicle relative to at least one other vehicle
   determine a driver performance score based at least in part on the relative fuel performance score;
   determine a trigger level based at least in part on the driver performance score, wherein the trigger level is a sensor signal level at which an event is to be transmitted to the vehicle event recorder, and the vehicle event recorder determines that an event is anomalous and transmits the event based at least in part on the sensor reading meeting the trigger level; and instruct the vehicle event recorder to increase the trigger level in response to driving efficiency having improved between a first point in time and a second point in time.

2. The system of claim 1, wherein the sensor reading includes a miles per gallon measure.

3. The system of claim 1, wherein the sensor reading includes a fuel burned measure.

4. The system of claim 1, wherein the sensor reading includes a distance traveled measure.

5. The system of claim 1, wherein the sensor reading includes a throttle measure.

6. The system of claim 1, wherein a relative fuel performance comprises a percentile score or z-score.

7. The system of claim 1, wherein a relative fuel performance comprises a rank.

8. The system of claim 1, wherein a relative fuel performance comprises a fuel performance compared with other drivers of the vehicle.

9. The system of claim 1, wherein a relative fuel performance comprises a fuel performance compared with other drivers of a vehicle type, wherein the vehicle type includes a group of vehicles sharing at least one characteristic.

10. The system of claim 1, wherein the trigger level comprises trigger level for storing video.

11. The system of claim 1, wherein the processor is further to determine a coaching indication based at least in part on the driver performance score.

12. The system of claim 1, wherein the driver performance score is based at least in part on an intensity of acceleration.

13. The system of claim 1, wherein the driver performance score is based at least in part on an intensity of braking.

14. The system of claim 1, wherein the driver performance score is based at least in part on an intensity of cornering.

15. The system of claim 1, wherein the driver performance score is based at least in part on an RPM score.

16. The system of claim 1, wherein the driver performance score is based at least in part on a throttle score.

17. The system of claim 1, wherein the driver performance score is based at least in part on a gear score.

18. The system of claim 1, wherein the driver performance score is based at least in part on a coast ratio.

19. The system of claim 1, wherein the driver performance score is based at least in part on an idle ratio.

20. The system of claim 1, wherein the driver performance score is based at least in part on a speed ratio.

21. The system of claim 1, wherein the processor is further to:
determine a set of vehicle fuel scores;
determine an outlying driver fuel score for a driver;
determine a vehicle associated with the outlying driver fuel score;
determine whether the vehicle is an outlying vehicle; and
in the event the vehicle comprises the outlying vehicle:
remove the outlying driver fuel score from a fuel score record for the driver.

22. A method, comprising:
receiving, by a vehicle data server, a sensor reading of a state of a vehicle, wherein the sensor reading is collected by a vehicle event recorder provided in the vehicle;
determining, using a processor of the vehicle data server, a relative fuel performance score based at least in part on the sensor reading, wherein the relative fuel performance score is a measure of a fuel performance of the vehicle relative to at least one other vehicle;
determining, using the processor, a driver performance score based at least in part on the relative fuel performance score;
determining, using the processor, a trigger level based at least in part on the driver performance score, wherein the trigger level is a sensor signal level at which an event is to be transmitted to the vehicle event recorder, and the vehicle event recorder determines that an event is anomalous and transmits the event based at least in part on the sensor reading meeting the trigger level; and
instruct the vehicle event recorder to increase the trigger level in response to driving efficiency having improved between a first point in time and a second point in time.

23. A computer program product for determining a driver performance score, the computer program product being embodied in a non-transitory computer readable storage medium and comprising computer instructions for:
collecting a sensor reading of a state of a vehicle from a vehicle event recorder provided in a vehicle;
determining a relative fuel performance score based at least in part on the sensor reading, wherein the relative fuel performance score is a measure of a fuel performance of the vehicle relative to at least one other vehicle;
determining a driver performance score based at least in part on the relative fuel performance score;
determining a trigger level based at least in part on the driver performance score, wherein the trigger level is a sensor signal level at which an event is to be transmitted to the vehicle event recorder, and the vehicle event recorder determines that an event is anomalous and transmits the event based at least in part on the sensor reading meeting the trigger level; and
instructing the vehicle event recorder to increase the trigger level in response to driving efficiency having improved between a first point in time and a second point in time.

24. A vehicle event recorder provided in a vehicle comprising:
a vehicle state sensor configured to collect a sensor reading, wherein the sensor reading indicates a state of the vehicle; and
a processor configured to:
determine a trigger level based on a driver performance score received from a remote server, wherein the driver performance score is based at least in part on a relative fuel performance score, and the relative fuel performance score is based at least in part on the sensor reading and the relative fuel performance score is a measure of a fuel performance of the vehicle relative to at least one other vehicle;
increase the trigger level in response to driving efficiency having improved between a first point in time and a second point in time;
determine that an event is anomalous based at least in part on the sensor reading meeting the trigger level; and
transmit events determined to be anomalous to the remote server.

* * * * *